United States Patent [19]

Le Méhauté et al.

[11] 4,037,028
[45] July 19, 1977

[54] SODIUM-SULPHUR TYPE ELECTRIC CELL

[75] Inventors: Alain Le Méhauté, Gif sur Yvette; Philippe Bordet, Sartrouville, both of France

[73] Assignee: Compagnie Generale d'Electricite, Paris, France

[21] Appl. No.: 738,995

[22] Filed: Nov. 4, 1976

[30] Foreign Application Priority Data

Nov. 20, 1975 France .................. 75.35469

[51] Int. Cl.² ........................... H01M 10/36
[52] U.S. Cl. .................. 429/104; 429/218; 429/191
[58] Field of Search .......... 429/104, 101, 191, 193, 429/30, 31, 218, 103, 105

[56] References Cited

U.S. PATENT DOCUMENTS

| | | | |
|---|---|---|---|
| 3,946,751 | 3/1976 | Breiter et al. | 429/166 |
| 3,994,745 | 11/1976 | Ludwig | 429/103 X |

Primary Examiner—Anthony Skapars
Attorney, Agent, or Firm—Sughrue, Rothwell, Mion, Zinn and Macpeak

[57] ABSTRACT

The invention relates to an electric cell of the sodium-sulphur type, suitable more particularly for undergoing a complete recharge. It comprises a cathode tank containing sulphur, an anode tank containing sodium, these reagents being separated by a solid electrolyte tube disposed in said cathode tank which is fitted with graphite felt washers ensuring cathode collection of the current generated, wherein some washers are disposed to have an edge distant from the wall of said electrolyte tube in order to avoid depositing sulphur on said tube during recharging. The invention is used in electric cells for electric vehicles.

2 Claims, 2 Drawing Figures

SODIUM-SULPHUR TYPE ELECTRIC CELL

FIELD OF THE INVENTION

The present invention relates to electric cells of the sodium-sulphur type.

BACKGROUND OF THE INVENTION

It is known that in these cells the anode reagent is constituted by an alkaline metal, generally sodium, which must be liquid at operation temperature. The cathode reagent is generally constituted by sulphur and the sodium salts of this substance, but can also be constituted by phosphorus, selenium and the alkaline salts of these substances. In the case where the reagent materials are sulphur and sodium, the electrochemical reaction leads to the reversible formation of sodium polysulphides whose sodium content increases during discharge. As for the electrolyte, which separates the cathode and anode reagents, it must be solid at operation temperature, i.e. about 300° C, permeable to the alkaline ions which form in the anode compartment and impermeable to electrons. It is generally constituted by beta sodium alumina, i.e. a compound having about 5 to 9 alumina molecules for one sodium oxide molecule. It is generally in the shape of a tube closed at its bottom, containing the anode reagent and immersed in the cathode reagent, the latter reagent being contained in a metal cathode tank and impregnating a graphite felt. The electrolyte tube is held by a support connected in a fluid-tight manner to this cathode tank and also to an anode reagent tank.

Generally, said support is in the form of a plate or disk made of alpha alumina. This disk has a central bore in which the beta sodium alumina is fixed.

In such cells, the discharge process leads to the transformation of sulphur into sodium polysulphuides in the sequence set forth hereinbelow:

$$S \rightarrow Na_2 S_5 \rightarrow Na_2 S_4 \rightarrow Na_2 S_3$$

During recharging, the reverse process occurs. However, it is observed that it is practically impossible in conventional cells to effect the transformation:

$$Na_2 S_5 \rightarrow S$$

and consequently to effect complete recharging.

This disadvantage appears to result from the fact that during recharging a film of sulphur is permanently deposited on the electrolyte tube which fulfills the function of a migration barrier with respect to the sodium ions and thus opposes the total regeneration of elementary sulphur.

On the basis of this experimental observation the applicant has produced a new structure for a sodium-sulphur cell suitable for remedying such a disadvantage and consequently for enabling a practically complete recharging of said cell.

SUMMARY OF THE INVENTION

The present invention provides an electric cell of the sodium-sulphur type, wherein a:

Cathode tank containing a cathode reagent which is liquid at operation temperature and selected from the group formed by sulphur, phosphorus, selenium and the alkaline salts of these substances.

At least one solid electrolyte tube closed at its bottom end, contains an anode reagent which is liquid at operation temperature, constituted by an alkaline metal and disposed in said cathode tank so as to be immersed in said cathode reagent, the walls of the tube being made of beta alkaline alumina.

An insulating ceramic support holds said electrolyte tube in said cathode tank with the connection between the support and the tube being provided by means of a glass part.

An anode tank containing a supply of said anode reagent is disposed above said cathode tank so that said electrolyte tube opens at its top part in this anode tank with said plate separating the open ends of said anode tank and of said cathode tank. Said cathode tank is fitted with axially spaced washers made of graphite felt ensuring cathode collection of the generated current with the edges of some of the washers facing the lateral wall of said electrolyte tube being disposed at a predetermined distance from the tube while at least one other washer bearing against the bottom of said electrolyte tube.

The predetermined distance between the edges of the washers and the lateral wall of said electrolyte tube is such that the ratio of the predetermined distance to half the transversal dimension of said cathode tank lies between 0.05 and 0.5.

An embodiment of the invention is described by way of a purely illustrative example having no limiting character with reference to the accompanying drawings.

DESCRIPTION OF THE PREFERRED EMBODIMENT

Figure 1:
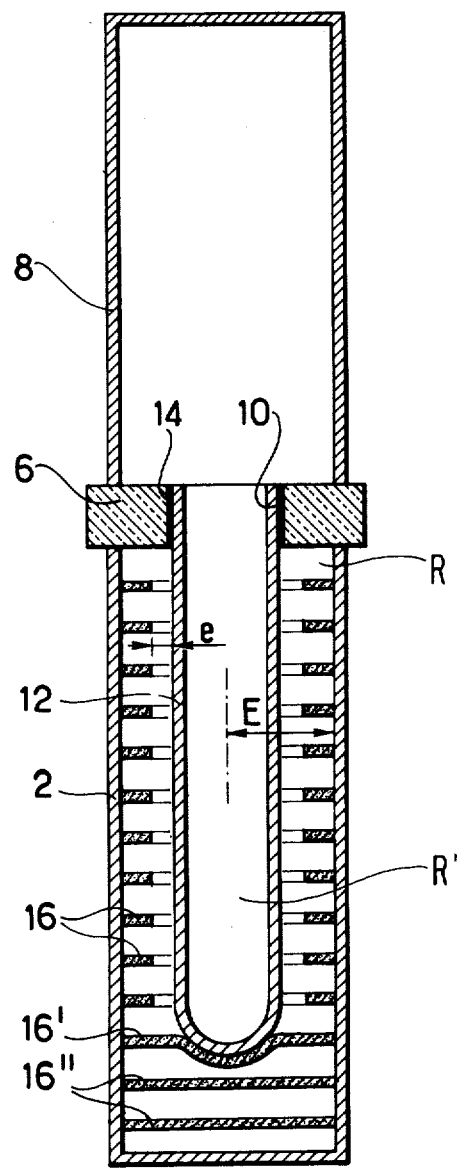
FIG. 1 is a cross-section of an electric cell embodying the invention.

The electric cell is in the form of a cylinder of revolution, and FIG. 1 is a cross-section veiw thereof in an axial plane, but of course it could have quite a different shape.

The electric cell shown has a conductive cylindrical cathode tank 2, fitted with multiple graphite felt washers as at 16, 16' and 16" impregnated with sulphur R and fulfilling the function of a current collector. The washers 16 have a hole in their centres to receive an electrode tube 12, while the washers 16' and 16" extend completely across the tank 2. The wall of the tank 2 is fixed at its top part to the bottom face of an alpha alumina plate 6 which is horizontal and circular.

A cylindrical anode tank 8 which is also conductive and has substantially the same diameter as the cathode tank 2, is fixed in the same way by its open bottom part to the top surface of the plate 6.

It contains a supply of anode reagent R' constituted by liquid sodium.

In the centre of the plate 6 there is a cylindrical bore 10 with a vertical axis. The open top end of the electrolyte tube 12 is engaged in the bore 10. The electrolyte tube 12 is closed at its bottom end, made of beta sodium alumina and contains the anode reagent R'.

The top edge of the tube 12 is in the plane of the top surface of the plate 6.

A glass connection part 14 is inserted between the outside wall of the top of the tube 12 and the wall of the bore 10 formed in the plate 6 so as to seal the connection.

The inner edge of the graphite felt washers referenced 16 are so disposed around the lateral wall of the tube 12 as to leave an annular space of thickness $e$ around said tube. The ratio of this thickness $e$ and the radius E of the tank 12 is so chosen that $$0.05 < e/E < 0.5$$

Preferably, this ratio is 0.2.

The washers 16' and 16" cover an area which is at least equal to the cross-section of the tank 2 and consequently bear against its inside wall; the washer 16' bearing against the bottom of the tube 12 as shown.

The operation of such an electric cell can be explained as follows:

During recharging, the sulphur is not deposited on the electrolyte tube 12, but instead it is deposited in small quantities on the rims of the washers 16 surrounding the tube 12.

However, taking into account the fact that the sulphur is in the form of polysulphides, such a deposit is thermodynamically unstable and cannot fulfill the function of a migration barrier.

It follows that $Na_2S_5$ can thus be transformed into sulphur, thereby ensuring a complete recharging of the electric cell. It will readily be understood that the electrical continuity necessary for discharge between the tank and the tube 12 is provided by the washer 16' as well as by the washers 16".

Figure 2:
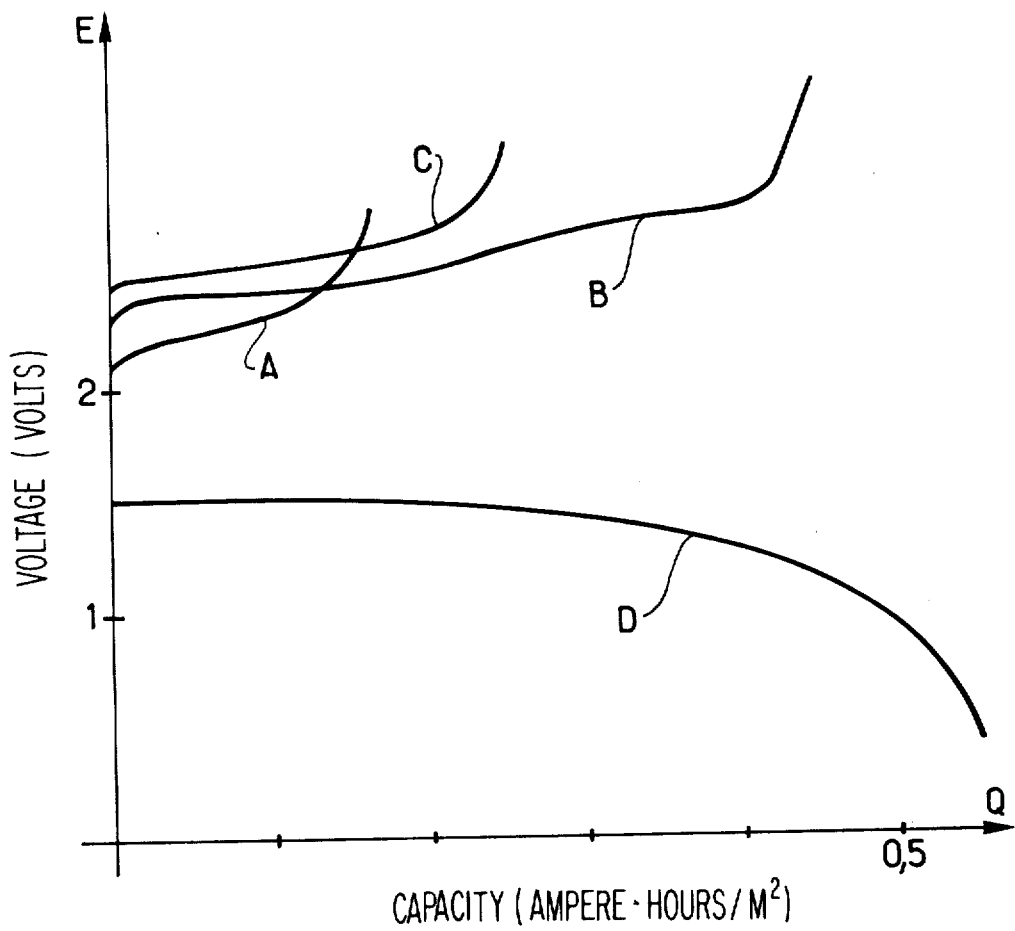
FIG. 2 is a graph of voltage against capacity showing the performance of an electric cell according to the invention.

The graph in FIG. 2 illustrates the performance of an electric cell according to the invention.

The graph shows the electromotive force E in volts as a function of the capacity Q expressed in amperehours/squ. cm. of electrolyte tube surface.

Curve A is the charge curve for a ratio $e/E = 0$
Curve B is the charge curve for a ratio $e/E = 0.05$
Curve C is the charge curve for a ratio $e/E = 0.1$ In all these cases, the density of the charge current is 50 mA/squ. cm.

Curve D is the discharge curve for a discharge current density of 200 mA/Squ. cm.

It must be understood that the invention is in no way limited to the embodiment described and illustrated which has been given only by way of an example. In particular, without going beyond the scope of the invention, details can be modified, dispositions can be changed or means can be replaced by equivalent means.

It must also be understood that the man in the art could produce electric cells such as described but having quite another shape, without thereby departing from the scope of the invention.

We claim:

1. An electric cell of the sodiumsulphur type, comprising:
   a cathode tank containing a cathode reagent which is liquid at operation temperature and is selected from the group consisting of sulphur, phosphorus, selenium and the alkaline salts of these subsstances,
   at least one solid electrolyte tube closed at its bottom end, containing an anode reagent which is liquid at operation temperature and constituted by an alkaline metal, said tube being disposed in said cathode tank so as to be immersed in said cathode reagent, said walls of the tube being made of beta alkaline alumina;
   an insulating ceramic support for holding said electrolyte tube in said cathode tank, a glass part forming a connection between said support and said tube;
   an anode tank containing a supply of said anode reagent and disposed above said cathode tank with said electrolyte tube opening at its top into said anode tank, said support separating the open ends of said anode tank and of said cathode tank, said cathode tank being fitted with a plurality of washers made of graphite felt for ensuring cathode collection of the generated current with the edges of some of the washers facing the lateral wall of said electrolyte tube being disposed at a predetermined distance from the tube and having at least one other washer bearing against the bottom of said electrolyte tube.

2. An electric cell according to claim 1, wherein said predetermined distance between the edges of some of the washers and the lateral wall of said electrolyte tube is such that the ratio of the predetermined half distance to the transversal dimension of said cathode tank lies between 0.05 and 0.5.

* * * * *